(12) United States Patent
Kent et al.

(10) Patent No.: US 7,641,974 B2
(45) Date of Patent: Jan. 5, 2010

(54) USE OF AQUEOUS DISPERSIONS OF VDF-BASED POLYMERS IN THE PREPARATION OF PAINTS FOR COATINGS OF ARCHITECTURAL SUBSTRATA

(75) Inventors: Bradley L. Kent, Woolwich Township, NJ (US); Michelle S. Kelly, Hightstown, NJ (US); Mario Visca, Alessandria (IT)

(73) Assignee: Solvay Solexis S.p.A., Milan (IT)

( * ) Notice: Subject to any disclaimer, the term of this patent is extended or adjusted under 35 U.S.C. 154(b) by 380 days.

(21) Appl. No.: 11/324,767

(22) Filed: Jan. 4, 2006

(65) Prior Publication Data

US 2006/0166007 A1    Jul. 27, 2006

(30) Foreign Application Priority Data

Jan. 5, 2005    (IT) .......................... MI2005A0007

(51) Int. Cl.
*B32B 27/00* (2006.01)
(52) U.S. Cl. .................... 428/421; 516/77; 524/757; 524/801
(58) Field of Classification Search .............. 428/421; 516/77; 524/757, 801
See application file for complete search history.

(56) References Cited

U.S. PATENT DOCUMENTS

| | | | |
|---|---|---|---|
| 2,242,218 A | 5/1941 | Auer | |
| 3,665,041 A | 5/1972 | Sianesi et al. | |
| 3,715,378 A | 2/1973 | Sianesi et al. | |
| 3,810,874 A | 5/1974 | Mitsch et al. | |
| 4,424,194 A | 1/1984 | Hughes | |
| 4,739,024 A | 4/1988 | Moggi et al. | |

FOREIGN PATENT DOCUMENTS

| | | |
|---|---|---|
| EP | 0 148 482 | 7/1985 |
| EP | 0 239 123 | 9/1987 |
| EP | 0 655 468 A1 | 5/1995 |
| EP | 655468 A1 * | 5/1995 |
| EP | 0 721 974 A1 | 7/1996 |
| EP | 721974 A1 * | 7/1996 |
| EP | 0 816 397 A1 | 1/1998 |
| EP | 816397 A1 * | 1/1998 |
| EP | 1 334 996 | 8/2003 |
| EP | 1 334 996 A2 | 8/2003 |

OTHER PUBLICATIONS

European Search Report Dec. 18, 2006 for application EP-05-02-0702.

* cited by examiner

*Primary Examiner*—Peter D. Mulcahy
*Assistant Examiner*—Henry Hu
(74) *Attorney, Agent, or Firm*—Arent Fox LLP

(57) ABSTRACT

Use for the preparation of paints for substrata coatings of aqueous dispersions of VDF-based polymers having an average particle size between 0.260 and 0.3 micrometers comprising a bifunctional surfactant of formula:

$$A\text{-}R_f\text{-}B \qquad (I)$$

wherein

A=—O—CFX—COOM; B=—CFX—COOM with X=F, $CF_3$;

M=$NH_4$, alkaline metal, H;

$R_f$ is a linear or branched perfluoroalkyl chain, or a (per)fluoropolyether chain such that the number average molecular weight of (I) is in the range 600-800.

15 Claims, 8 Drawing Sheets

GLOSS RETENTION OF BLUE PIGMENTED PANELS AFTER 5000 HOURS OF EXPOSURE TO QUV

USE OF AQUEOUS DISPERSIONS OF VDF-BASED POLYMERS IN THE PREPARATION OF PAINTS FOR COATINGS OF ARCHITECTURAL SUBSTRATA

The present invention relates to the use of fluoropolymer aqueous dispersions having particles with an average diameter from 0.260 to 0.3 micrometers (i.e., between 260 and 300 nm), for the preparation of paints far high performance external architectural coatings.

More specifically the invention relates to the use of vinylidene fluoride (VDF) dispersions, for example polyvinylidene fluoride (PVDF), having particles with average diameter from 0.260 to 0.3 micrometers containing particular bifunctional fluorinated surfactants, and showing a lower environmental impact.

The PVDF-based paints have been used since more than four decades for the coil painting for architecture as they are capable to produce high performance coatings.

Generally, the PVDF-based painting compositions comprise pigments, resins, generally acrylic resins, and various additives and can be applied in a liquid form, when formulated in water or in particular solvents, or in powder form.

Known high performance paints used for coatings in architecture are PVDF based dispersions, having particles with an average diameter between 0.260 and 0.3 micrometers prepared by emulsion polymerization in the presence of a surfactant formed of a mixture of perfluorinated monofunctional carboxylates having a chain length between 7 and 13 carbon atoms and average molecular weight of about 480. Said surfactant is commercially known as Surflon™ S111 (Asahi Glass). The PVDF dispersion prepared by polymerization by using this monofunctional surfactant of the prior art is coagulated, and the polymer is then washed, dried in a spray dryer and then formulated with other additives to obtain the paint. In the above described procedure an important phase is represented by the surfactant removal from the water disposal to reduce the environmental impact. The removal can be carried out, for example, by adsorbing the surfactant on a suitable solid material as for example clay. However, the above surfactants are not strongly adsorbed on these materials. Therefore, to avoid the dispersion in the environment of said surfactants, more complicated processes must be utilized.

The need was therefore felt to have available VDF-based polymer dispersions prepared without using the above surfactants of the prior art, able to give high performance coatings in architecture substantially having the same characteristics and properties of the coatings obtained with the Surflon™ S111-based dispersions of the prior art, in particular the same durability and gloss.

In practice the need was felt to have available a drop-in VDF-based dispersion of those using Surflon™ S111 commercially used in the paint preparation. By drop-in it is meant that the VDF-based dispersions must substantially give the same performances as durability and gloss of the coatings, as said above, and as process for the preparation of the dispersion which must not imply the substantial formation of coagula. From the industrial point of view, this would result indeed a remarkable drawback as the formation of polymer coagula represents a product loss and requires process interruptions to carry out the cleaning of the reactor.

Furthermore the dispersions must be able to be subjected to industrial post-treatment processes, as coagulation, washing and drying, at present in use for the dispersions obtained with the Surflon™ S111 surfactant. All that to have a substantially drop-in suspension of those existing using the Surflon™ S111 surfactant.

Furthermore it was desired that the surfactants of the new dispersions had an improved adsorption on clays in comparison with the prior art surfactants, i.e., with a higher adsorption coefficient on clays.

It has been unexpectedly and surprisingly found that it is possible to solve the above technical problem by using a particular class of surfactants, overcoming the drawbacks of the prior art.

An object of the present invention is therefore the use for the preparation of paints for high performance substrata coatings of aqueous dispersions of VDF-based polymers having an average particle size between 0.260 micrometers and 0.3, micrometers obtainable by VDF emulsion polymerization, optionally in the presence of one or more fluorinated comonomers, in the presence of a bifunctional surfactant of formula:

$$A-R_f-B \qquad (I)$$

wherein A=—O—CFX—COOM; B=—CFX—COOM with X=F, $CF_3$;
M=$NH_4$, alkaline metal, H;
$R_f$ is
  a linear or branched perfluoroalkyl chain; or
  a (per)fluoropolyether chain so that the number average molecular weight of (I) is in the range 600-800, preferably 650-800.

When the compound of formula (I) does not derive from polymerization, with number average molecular weight it is meant the number molecular weight of the compound.

Preferably $R_f$ is a (per)fluoropolyether chain.

When $R_f$ is a (per)fluoropolyether chain, $R_f$ represents a (per) fluoropolyether chain comprising repeating units selected 6 from one or more of the following, statistically distributed along the chain:

a) —$(C_3F_6O)$—
b) —$(CF_2CF_2O)$—;
c) —$(CFL_0O)$—, wherein $L_0$=—F,—$CF_3$;
d) —$(CF_2(CF_2)_{z'}CF_2O)$—, wherein z' is an integer 1 or 2;
e) —$(CH_2CF_2O)$—.

More specifically $R_f$ has one of the following structures:
1) —$(CF_2O)_a$—$(CF_2CF_2O)_b$—
  wherein a and b are defined hereinafter; when both the units ($CF_2O$) and ($CF_2CF_2O$) are present, b/a is between 0.3 and 10, extremes included, a being an integer different from 0; or one of the two units can be absent, preferably that having index a;
2) —$(CF_2$—$(CFZ)_{z'}$—$CF_2O)_{b'}$—
  z' is an integer and is 1 or 2; b' being defined hereinafter;
3) —$(CF_3$—$(F_6O)_r$'—$(C_2F_4O)_b$—$(CFL_0O)_t$—
  r, b, t being defined hereinafter; when all the three units are present: r/b=0.5-2.0 (r+b)/t=10-30, b and t being integers different from 0; or one or two of the three units can be absent, preferably that having index b; $L_0$ being defined above;
4) —$(CF_3$—$F_6)_r$—$(CFL_0O)_t$—$OCF_2$—$R'_f$—$CF_2O(C_3F_6O)$$_r$—$(CFL_0$-O$)_t$—
  wherein:
  r, t are defined hereinafter;
  $R'_f$ is a fluoroalkylene group from 1 to 4 carbon atoms;
  $L_0$ being as above;
5) —$(CF_2F_2CH_2O)_{q'}$—$R'_f$—O—$(CH_2CF_2CF_2O)_{q'}$—
  wherein $R'_f$ as defined above; q' as defined below;
6) —$(C_3F_6O)_r$—$OCF_2$—$R'_f$—$CF_2O$—$(C_3F_6O)_r$—
  wherein $R'_f$ as defined above; r as defined below; in said formulas —$(C_3F_6O)$— can represent units of formula: —(CF($CF_3$)$CF_2O$)— and/or —($CF_2$—CF($CF_3$)O)—; a, b, b', q', r, t, are integers, such that $R_f$ shows number average molecular weight values such to give the number average molecular weight of the above surfactant of formula (I).

The preferred (per) fluoropolyether chain $R_f$ is the 1) having the structure: $-(CF_2O)_a-(CF_2CF_2O)_b-$, wherein a and b are so that the number average molecular weight of the surfactant of formula (I) is within the above range.

The surfactants of general formula (I) wherein $R_f$ is a (per) fluoropolyether are obtainable by well known processes of the prior art, see for example the following patents herein incorporated by reference: U.S. Pat. Nos. 3,665,041, 2,242, 218, 3,715,378, and European patent EP 239,123. The functionalized fluoropolyethers of formula (I) can be obtained for example according to patents EP 148,482, U.S. Pat. No. 3,810,874 by hydrolysis of the corresponding ester or by oxidation of the hydroxyl function.

The dispersions of the invention contain an amount of surfactant of formula (I) between 0.01 and 3% by weight with respect to the fluoropolymer, preferably between 0.05 and 1% by weight.

The dispersions of the invention can also contain mixtures of surfactants of formula (I). The dispersions of the invention can optionally contain also other fluorinated surfactants, different from those of formula (I), for example in amounts from 0.0001 to 0.1% by weight on the VDF-based polymer weight, and generally in amounts not higher than 20% by weight with respect to the total amount of the surfactant of formula (I). The presence of said surfactants, belonging to the classes commonly used in the polymerization of fluorinated polymers, does not compromise the environmental impact of the dispersions, as these are used in small amounts.

In particular the optional surfactants which can be used are selected from the following:

$$T(C_3F_6O)_{n0}(CFXO)_{m0}CF_2COOM \quad (II)$$

wherein:
T can be Cl or a perfluoroalkoxide group; $C_kF_{2k+1}O$ wherein k=integer from 1 to 3, optionally one F atom being substituted by one Cl atom;
n0 is an integer ranging from 1 to 6 and m0 is an integer from 0 to 6;
M and X are as above;

$$CF_3(CF_2)_{n1}COOM \quad (III)$$

wherein:
n1 is an integer ranging from 4 to 12;
M is as above;

$$F-(CF_2-CF_2)_{n2}-CH_2-CH_2-SO_3M \quad (IV)$$

wherein:
M is as above;
n2 is an integer ranging from 2 to 5.

VDF-based polymers mean the VDF homopolymer (PVDF) and the VDF-based polymers obtained by copolymerizing the VDF with small amounts of one or more fluorinated comonomers, for example chlorotrifluoroethylene (CAFE), hexafluoropropene (HFP), tetrafluoroethylene (TIE), etc.

See, for example, U.S. Pat. Nos. 4,424,194 and 4,739,024.

Said VDF copolymers generally contain comonomer amounts between 0.1 and 10% by moles. The preferred amounts of comonomer are generally in the range 0.5-6% by moles. The VDF homopolymer (PVDF) is preferred.

The VDF-based polymer dispersions of the present invention are prepared according to emulsion polymerization methods comprising:

a) feeding of the solution of a bifunctional surfactant of formula (I) into the polymerization reactor, in such amount that the surfactant concentration is from 0.05 to 20 g per litre of reaction medium, preferably from 0.1 to 5 g per litre of reaction medium;
b) optionally the surfactant of formula (I) added in this phase can be partially substituted, as already said above, by a fluorinated surfactant different from the surfactant of formula (I) in the above amounts, said optional surfactant preferably selected from those of formula (II)-(IV);
c) feeding of the reaction medium into the polymerization reactor, reactor degassing, addition in the reactor of one or more fluorinated monomers, optionally chain transfer agents, optionally stabilizers;
d) addition of the polymerization initiator and, optionally, during the polymerization, of additional amounts of monomers and/or comonomers, initiators, transfer agents;
e) optionally, addition during the polymerization of additional amounts of surfactant of formula (I), so as to obtain a final concentration of total fluorinated surfactant (initial surfactant+surfactant added during the polymerization) from 0.01 to 3% by weight with respect to the weight of the VDF-based polymer, preferably from 0.05 to 1% by weight; at least 80% by weight, more, preferably at least 90% by weight, and still more preferably 100% by weight of the total amount of surfactant as defined above being formed of a surfactant of formula (I);
f) discharge from the reactor of the polymer latex.

For the preparation of these dispersions see for example patent application EP 1,334,996.

The stabilizers, the chain transfer agents and the polymerization initiators are those commonly used in the polymerization of VDF-based polymers.

The discharged latex is subjected to the usual post-treatments known in the prior art depending on the required uses (powder painting, solvent painting, water painting). For example the discharged dispersion can be coagulated to obtain polymer powders or can be subjected to concentration carried out for example by heating in the presence of non ionic surfactants or by ultrafiltration.

The, VDF-based, polymer dispersions of the invention are obtainable with the above process without a substantial formation of coagulum. Generally the coagulum is lower than 5%, preferably lower than 3.5% (defined as the percentage of coagulated particles with respect to the initial weight of 12 monomer/monomers).

It resulted surprising and unexpected that the VDF-based polymer dispersions prepared without using the Surflon™ S111 surfactant were capable to give high performance coatings in architecture substantially having the same characteristics and properties as those obtained with the dispersions of the prior art based on Surflon™ S111, in particular the same durability and gloss. Furthermore it resulted unexpected that the VDF-based polymer dispersions of the present invention are drop-in of those employing Surflon™ S111 commercially used in the paint preparation. It has in fact been found by the Applicant that the VDF-based dispersions of the present invention substantially give the same performances, in particular as coating durability and coating gloss. Besides, also the properties of adhesion, solvent resistance (MEK double strokes), impact resistance, hardness, flexibility are substantially of the same order in case of the dispersions containing Surflon™ S111 and in case of the dispersions of the present invention. Also in case of the preparation process, the dispersions of the present invention substantially give the same performances as their preparation substantially does not imply formation of coagula. As said, from the industrial point of view, this represents a significant advantage since the coagulation during the polymerization represents a product loss and requires interruptions of the process to carry out the cleaning of the reactor. Furthermore the dispersions of I the invention are suitable to be subjected to industrial post-treatment processes, as the coagulation, washing and drying, at present in use for the dispersions obtained with the Surflon™ S111 surfactant. Therefore the, VDF-based, dispersions of the invention are substantially drop-in of those existing using the Surflon surfactant. It has furthermore been found by the Applicant that the dispersion surfactants of the invention have an improved adsorption on clays in comparison with the surfactants of the prior art, i.e. they have a higher adsorption coefficient on clays. Therefore the dispersions of the invention have a lower environmental impact.

The, VDF-based, polymer dispersions of the invention obtainable by the polymerization can be used as such for the formulation of aqueous paints. Alternatively said dispersions can be coagulated to obtain powders usable for the paint preparation. The latter can be applied by the powder coating technique. Another application of coagulated powders is their use in the formulation of solvent-based paints. The latter application is the preferred one.

As solvents, those used for the paints based on VDF prepared by using Surflon, preferably high boiling solvents, more preferably isophorone, can be used.

The dispersions of the present invention are preferably used for coating metal substrata.

A further object of the present invention are aqueous paints, powder paints, solvent paints using the, VDF-based, polymer dispersions of the invention. These paints can also contain additives as pigments, filming resins as the acrylic resins, for example Acryloid B44, thickeners, for example clays as Bentone SD3.

As pigments, inorganic and/or organic pigments can be used. They must be stable to light and under the paint processing conditions, preferably at 250° C. for 120 sec. Examples of pigments are titanium dioxide, silica, iron oxides, talc, taica, zirconium oxide, carbon black.

The VDF-based polymer content in the paints is generally between 20 and 40% by weight. The solvent content in solvent-based paints generally ranges from 45° s. to 60% by weight.

The coatings obtainable from the paints and the dispersions of the present invention are preferably on metal substrata as sheets, metal coils, section bars and other already formed metallic structures.

Generally these substrata after painting with the paints of the present invention are thermally treated at temperatures capable to guarantee the formation of a VDF-based polymer continuous film.

Metal substrata mean substrata based on metals, or steels, cast iron or metal alloys, etc.

A further object of the present invention are manufactured articles based on metal substrata, preferably coils, for architecture comprising on the surface coatings obtainable from the above defined paints. Said coatings are obtainable by applying said paints on the surface of the metal substratum by using the known application methods of the prior art, for example powder coating, spray painting or coil coating. The last method consists in applying the paint on a metal coil by a roll in automatic high-rate systems, followed v x by a thermal treatment in continuous ovens at a temperature up to 250°-270° C.

Figure 1:
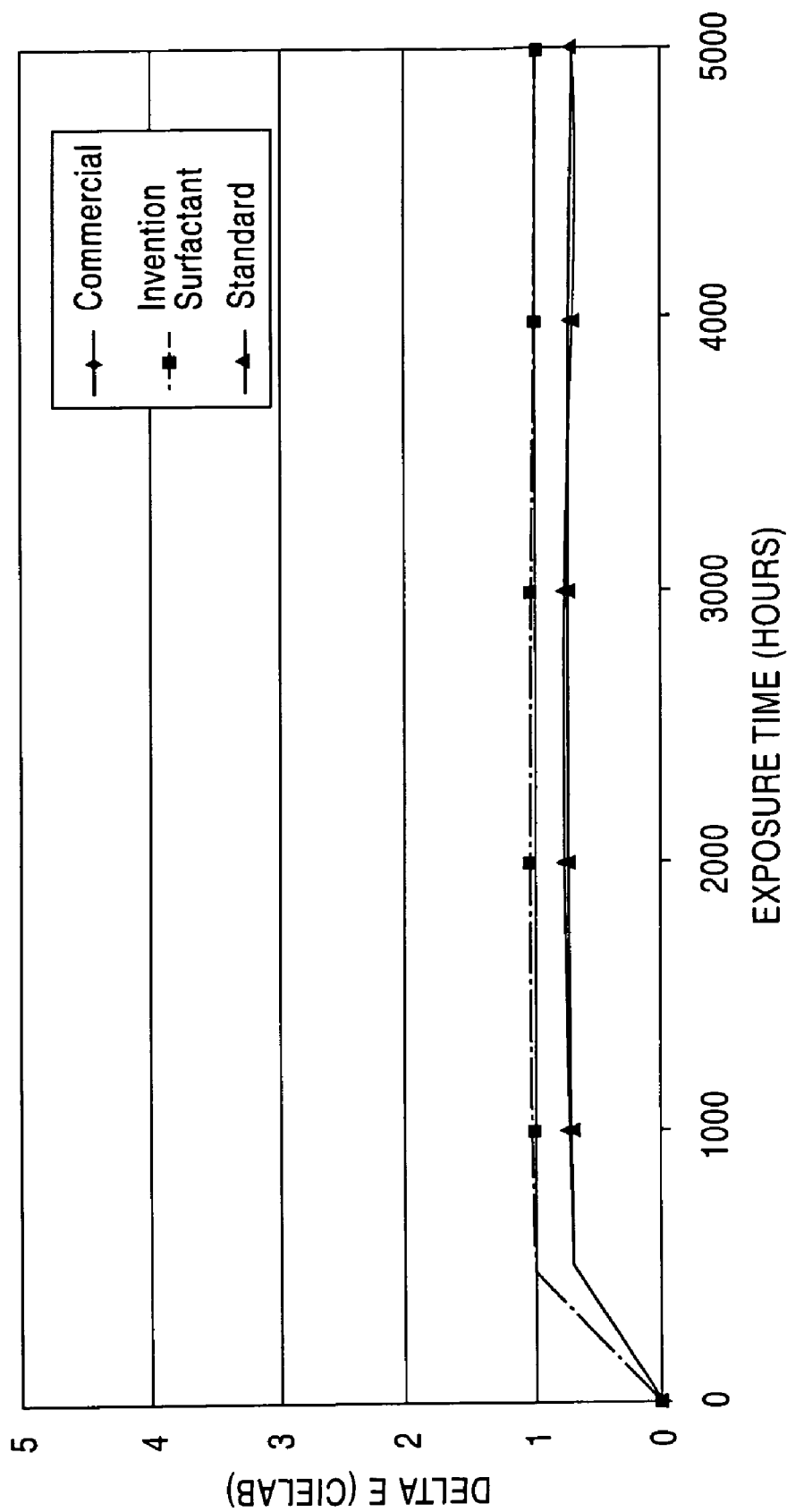
FIG. 1 is a graph showing the colour change of white pigmented panels after 5000 hours exposure to QUV.

The present invention will be illustrated by the following Examples, which have a merely indicative and non limitative purpose.

EXAMPLES

The properties and parameters of interest related to the polymers described in the Examples are determined by the analysis and characterization methods described hereinafter:

Determination of the Average Article Diameter

The average particle diameter is measured by an instrument based on the laser light scattering, in particular the Photon Correlation Spectroscopy, equipped with Brookhaven correlator 2030 AT model and Argon Laser light source having a wave-length of 514.5 nm by Spectra-Physics. The latex specimens to be subjected to measurement are suitably diluted with water filtered at 0.2 μm on Millipore filter. The scattering measurement is carried out at room temperature at an angle of 90°.

Determination of the Dispersion Polymer Content

The polymer content of the latex discharged from the reactor is evaluated by drying at 105° C. for 1 hour about 2 g of latex. The dry product content of the latex is obtained by the formula:

Dry product %=(weight after drying/latex initial weight)×100.

Coating Characteristics

The coating characteristics are evaluated according to f the ASTM and AAMA methods.

These methods are those used in the j art for the evaluation of the polymeric coating properties.

Adsorption on Clay

The measurements have been carried out according to the OECD 106 methods.

Preparation of the PVDF Dispersions

Example 1

A 7.5 liter stainless steel horizontal reactor equipped with a stirrer was charged with 5,375 g of demineralized water and an aqueous solution of a bifunctional fluorinated surfactant of formula (I) having M=NH$_4$, X=F, A=-O—CFX—COOM; B[?]—CFX—COOM; R$_f$ equal to a structure of class 1), and a number average molecular weight of 738, in such amount that its concentration in the aqueous phase of the reactor is 0.84 g/l.

4 g of paraffinic wax having a melting point between 50° and 60° C. are then added. The reactor is sealed and heated to 100° C. under stirring, degassing for about 2 minutes.

The reactor is heated up to 122.5° C.; then a sufficient amount of vinylidene fluoride is fed into the reactor such to bring the reactor pressure to 46.5 bar. The addition of 21.5 ml of di-tertbutyl peroxide (DTBP) initiator triggers the polymerization. After an induction period of about 15 minutes, the reactor pressure slowly decreases, indicating the polymerization beginning.

The vinylidene fluoride is continuously added to maintain the reactor pressure constant while the temperature is maintained at 122.5° C. by circulating water and ethylene glycol in the reactor jacket.

About 170 minutes, time necessary for the time necessary for the introduction of a total amount of 2,298 g of monomer, the feed is stopped. To optimize the yield, the polymerization is allowed to continue until the reactor pressure decreases to about 11-bar. At this point the reactor is cooled, the unreacted vinylidene fluoride is vented, then the latex is discharged from the reactor and filtered on 80 mesh to remove possible coagula.

The latex contains 30.7% by weight of polymer. The reactor is washed to remove the possible coagulum formed during to polymerization.

A loss of 2% due to the coagulum was evaluated (defined as the percentage of coagulated particles with respect to the initial weight of 2,298 g of vinylidene fluoride).

The filtered latex is analyzed by laser light scattering technique and it is found to have an average size of the particle diameter of 0.271 μm.

The latex is then coagulated by mechanical stirring; the coagulated polymer is washed several times with demineralized water until the washing water conductivity decreases under μohm/cm. The wet polymer is dried in a convection stove at 60° C. until the moisture content is lower than 0.15% by weight.

The polymer melt viscosity, measured at 232° C. and shear rate 100 s$^{-1}$ with the Kayeness Galaxy capillary rheometer (L/D=15/1) is of 32.0 kP.

The polymer thermal stability was evaluated to be excellent based on colour observation after heating of the dried powder at 270° C. for 1 hour in an aluminum vessel.

Example 2

The process of the Example 1 was used to prepare PVDF by using a bifunctional perfluoropolyether surfactant formed of a mixture of surfactants of formula (I) wherein M=NH$_4$, X=F, A=-O—CFX—COOM; B=—CFX-LOOM; R$_f$ belongs to class 1) selected such that the number average molecular weights are 659, 700, 738 and 764, in a weight ratio respectively of 2.5:1.88:1.62:1.00 in such amount to have a total concentration of surfactants in the aqueous phase of the reactor f 1.12 g/l.

The total reaction time was 166 minutes and the conception of the obtained latex is 30.3% by weight.

The polymer loss due to coagulation was 3.2% and the average radius of the particles, measured after filtration, is 0.267 μm.

After coagulation and washing the polymer thermal stability was evaluated to be excellent based on colour observation after heating of the dried powder at 2700 C for 1 hour. in an aluminum vessel.

Example 3 (Comparative)

According to the teachings of EP 816 397 the VDF polymerization is carried out in the presence of a microemulsion of perfluoropolyethers and of a monofunctional surfactant by following the procedure described hereinafter.

In a glass reactor equipped with stirrer, under mild stirring, 4.83 g of NaOH are dissolved in 32.83 g of demineralized water. The obtained solution is added with:
1) 52.35 g of acid having number average molecular weight 434 and formula:

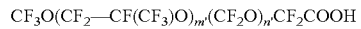

free from fractions having molecular weight higher than 700 and containing 9% by weight of fractions having a molecular weight between 600 and 700.
2) 10 g of Galden$^{(R)}$ of formula:

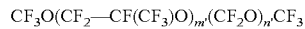

wherein m'/n'=20, having number average molecular weight=760.

The obtained system is quite clear between 2° and 90° C.

Subsequently 50 ml of the prepared microemulsion containing 38.4 g of surfactant are introduced into a 2 l l horizontal reactor containing 16 l of water, equipped with stirrer working at 50 rpm.

The reactor is heated up to 125° C. and then brought to the pressure of 49 relative bar by feeding gaseous VDF.

Further to the feeding of 55 g of diterbutylperoxide the reaction starts and VDF is thus continuously fed so as to maintain the pressure constant of 49 relative bar. After 28 g of reacted monomer, 62 g of HCFC-123 are fed as chain transfer agent.

After 56 g of reacted monomer the synthesis temperature is brought to 100° C. and the reaction continues at this temperature. After a predetermined amount of reacted monomer corresponding to 4,800 g the reaction is stopped. The total polymerization time is equal to 486 minutes.

The polymer concentration in the latex is equal to 250 g/l of latex.

The number of the latex particles of which the emulsion is formed is measured by coulter nanosizer and is equal to 5.3×10$^{16}$ particles/litre of water.

The average particle diameter results to be 100 nm.

Example 4 (Comparative)

The process of the Example 1 was repeated by using a bifunctional surfactant of formula (I) wherein M=NH$_4$, X=F, A=—O—CFX—COOM; B=—CFX—COOM; R$_f$ is a structure of class
1) but have a number average molecular weight of 870.

Amounts of surfactant were used such to give concentrations of surfactant in the range defined by the Examples 1 and 2, i.e. between 0.6 and 1.2 g/l.

In all these cases latexes containing particles having an average size in the range 0. 1-0.11 micrometers were obtained, i.e. dimensions outside the range defined in the present invention.

Furthermore, the obtained latex results highly viscous due to the high concentration of small particles and the latex results intrinsically unstable. This has prevented from obtain significant amounts of powder to prepare paint formulation.

Therefore said surfactant appeared unsuitable to the synthesis of a product suitable for the formulation of high performance paints.

Application Examples

Example 5

The polymer obtained in the Example 1 is formulated according to the methods described hereinafter, to obtain a paint which is applied on a metal substratum (chromium-plated aluminum) and the coating has been characterized according to the AAMA.2605 # method.

The painting composition is prepared by mixing the PVDF with the following components:

| COMPONENT | phr (phr = parts per 100 parts PVDF) |
|---|---|
| PVDF | 100 |
| Acrylic resin (Acryloid B44) | 42.8 |
| Isophorone | 204 |
| Titanium dioxide (Ti Pure 8960) | 77 |
| PVDF/acrylic resin ratio = | 70/30 |

The above formulation was prepared as follows.

By means of a sand mill the pigment is dispersed in the acrylic resin Acryloid B44 until having a homogeneous dispersion.

To said dispersion the chosen amount of PVDF powder and the solvent are then added: the system is further homogenized with a high rate disperser for about 15 minutes and a Red Devil type mill for 15 hours.

The paint, is then rod applied (rod #480) on chromium-plated aluminum sheets.

The film is placed in a stove, maintained for 120 seconds at the peak temperature of 249° C. and subjected to characterization by using the tests reported hereinafter in Table 1.

TABLE 1

| Test | Measured value | Method |
|---|---|---|
| Adhesion (cross hatch) | 100% | ASTM D 3359 |
| Crosslinking degree (MDK double strokes) | 200 | |
| Reverse impact test/ #80 | >80 | AAMA ref. 7.5.1 |
| Pencil hardness | 2H | AAMA ref. 7.3 |
| Dried film thickness | 20 μm | |
| Flexibility (OT bend) | OK | |
| (OT be | (film not removed by adhesive tape after bending at 180°) | |
| Gloss 60° | 61.3 | ASTM D 4214-89 |
| Gloss 20° | 23.1 | |
| 20 min in boiling water + cross hatch test | OK | |
| 2 hours in boiling water + cross hatch test | OK | |

Example (Comparative)

A PVDF powder prepared as in the Example 1 but by using a prior art surfactant formed of a mixture of perfluorinated monofunctional carboxylates having a chain length substantially between 7 and 13 carbon atoms (Surflon™ S111), is formulated to obtain a paint which is applied on a metal (chromium-plated aluminum) and characterized, according to the AAMA 2605 # method.

The formulation is prepared according to the method described in the Example 5 and by mixing the PVDF with the following components:

| COMPONENT | phr (phr = parts per 100 parts PVDF) |
|---|---|
| PVDF | 100 |
| Acrylic resin (Acryloid B44) | 42.8 |
| Isophorone | 204 |
| Titanium dioxide (Ti Pure R960) | 77 |
| PVDF/acrylic resin ratio = | 70/30 |

The paint is then rod applied (rod #480) on chromium-plated aluminum sheets. The film is placed in a stove, maintained for 120 seconds at the peak temperature of 249° C. and subjected to characterization by using the tests reported hereinafter in Table 2.

By comparing the data of Table 1 with the data of Table 2 it results that the films obtained from the dispersions of the present invention substantially show the same good properties of the films obtained from the PVDF dispersions containing the surfactants of the prior art.

TABLE 2

| Test | Measured value | Method |
|---|---|---|
| Adhesion (cross hatch) | 100% | ASTM D 3359 |
| Crosslinking degree (MEK double strokes) | 200 | |
| Reverse impact test/ #80 | >80 | AAMA ref. 7.5.1 |
| Pencil Hardness | 2H | AAMA ref. 7.3 |
| Dried film thickness | 20 Am | |
| Flexibility (OT Bend) | OK (film not removed by adhesive tape after bending at 180°) | |
| Gloss 60° | 62 | ASTM D 4214-89 |
| Gloss 20° | 24.5 | |
| 20 min in boiling water = cross hatch test | OK | |
| 2 hours in boiling water = cross hatch test | OK | |

Example 7

The polymer obtained in the Example 1 is formulated, by following the methods described in the Example 5, to obtain a paint which is applied on a metal substratum (chromium-plated aluminum) and characterized according to the AAMA 2605 # method.

The formulation is prepared by mixing the PVDF with the following components:

| COMPONENT | phr (phr = parts per 100 parts PVDF) |
|---|---|
| PVDF | 100 |
| Acrylic resin (Acryloid B44) | 43.8 |
| Isophorone | 235 |
| Shepherd Blue #3 (pigment) | 42.5 |

-continued

| COMPONENT | phr (phr = parts per 100 parts PVDF) |
|---|---|
| Bentone SD3 (thickener) | 1.3 |
| PVDF/acrylic resin ratio = | 70/30 |

The paint is then rod applied (rod #480) on chromium-plated aluminum sheets. The film is placed in a stove, maintained for 120 seconds at the peak temperature of 249° C. and subjected to characterization by using the tests reported hereinafter in Table 3.

TABLE 3

| Test | Measured value | Method |
|---|---|---|
| Adhesion (cross hatch) | 100% | AAMA ref. 7.4.1.1 |
| Crosslinking degree (MEK double strokes) | 170 | |
| Reverse impact test/ #80 | >8b | AAMA ref. 7.5.1 |
| Pencil hardness | 2H | AAMA ref. 7.3 |
| Dried film thickness | 20 μm | |
| Flexibility (OT bend) | OK (film not removed by adhesive tape after bending at 180°) | |
| Gloss 60° | 62 | ASTM D 4214-89 |
| Adhesion after boiling | OK | AAMA ref. 7.4.1.3 |
| Resistance to abrasion | >40 | AAMA ref. 7.6.1 |
| Resistance to nitric acid | OK | AAMA ref. 7.7.3 |
| Resistance to detergents | OK | AAMA ref. 7.7.4 |

Example 8 (Comparative)

A PVDF powder prepared as in the Example 1 but by using the surfactant of the Example 6 (comparative), is formulated according to the method described in the Example 5, to obtain a paint which is applied on a metal substratum (chromium-plated aluminum) and characterized according to the AAMA 2605 # method.

The formulation is prepared by mixing the PVDF with the following components:

| COMPONENT | phr (phr = parts per 100 parts PVDF) |
|---|---|
| PVDF | 100 |
| Acrylic resin (Acryloid B44) | 43.8 |
| Isophorone | 235 |
| Shepherd Blue #3 | 42.5 |
| Bentone SD3 | 1.3 |
| PVDF/acrylic resin ratio = | 70/30 |

The paint is then rod applied (rod #480) on chromium-plated aluminum sheets. The film is placed in a stove, maintained for 120 seconds at the peak temperature of 249° C. and subjected to characterization by using the tests reported hereinafter in Table 4.

By comparing the data of Table 3 with the data of Table 4 it results that the films obtained from the dispersions of the present invention substantially show the same good properties of the films obtained from the PVDF dispersions containing the surfactants of the prior art.

TABLE 4

| Test | Measured value | Method |
|---|---|---|
| Adhesion (Cross hatch) | 100% | AAMA ref. 7.4.1.1 |
| Crosslinking degree (MEK double strokes) | 170 | |
| Reverse mpact test/ #80 | >80 | AAMA ref. 7.5.1 |
| Pencil hardness | 2H | AAMA ref. 7.3 |
| Dried film thickness | 20 μm | |
| Flexibility (OT bend) | OK (film not removed by adhesive tape after bending at 180°) | |
| Gloss 60° | 62 | ASTM D 4214-89 |
| Adhesion after boiling | OK | AAMA ref. 7.4.1.3 |
| Resistance to abrasion | >40 | AAMA ref. 7.6.1 |
| Resistance to nitric acid | OK | AAMA ref. 7.7.3 |
| Resistance to detergents | OK | AAMA ref. 7.7.4 |

Accelerated Ageing Application Tests

Example 9

Both the specimens obtained by applying the white formulations of the examples 5 and 6 (comparative) were subjected to accelerated ageing and compared with a commercial standard of the Quality Control, using the following tests:

corrosion resistance test (QCT test and salt fog chamber—4,000 hours of exposure) Specifications AAMA 2605-02 (7.8).

QUV test (lamps UVB-313; cycle: 8 hours of UV light at 70° C. followed by 4 hours of condensation at 50° C.—5,000 hours)

Accelerated Xenon lamp Test (5,000 hours)

All the specimens were examined to show possible blistering effects, delamination, colour variation and gloss variation, at different exposure times.

The specimens prepared according to the present invention have shown resistance to moisture and to salt fog (4,000 hours) since they have shown no blistering effects and/or delamination. In particular the resistance to corrosion resulted equivalent to that of the specimens prepared according to the prior art.

Figure 2:
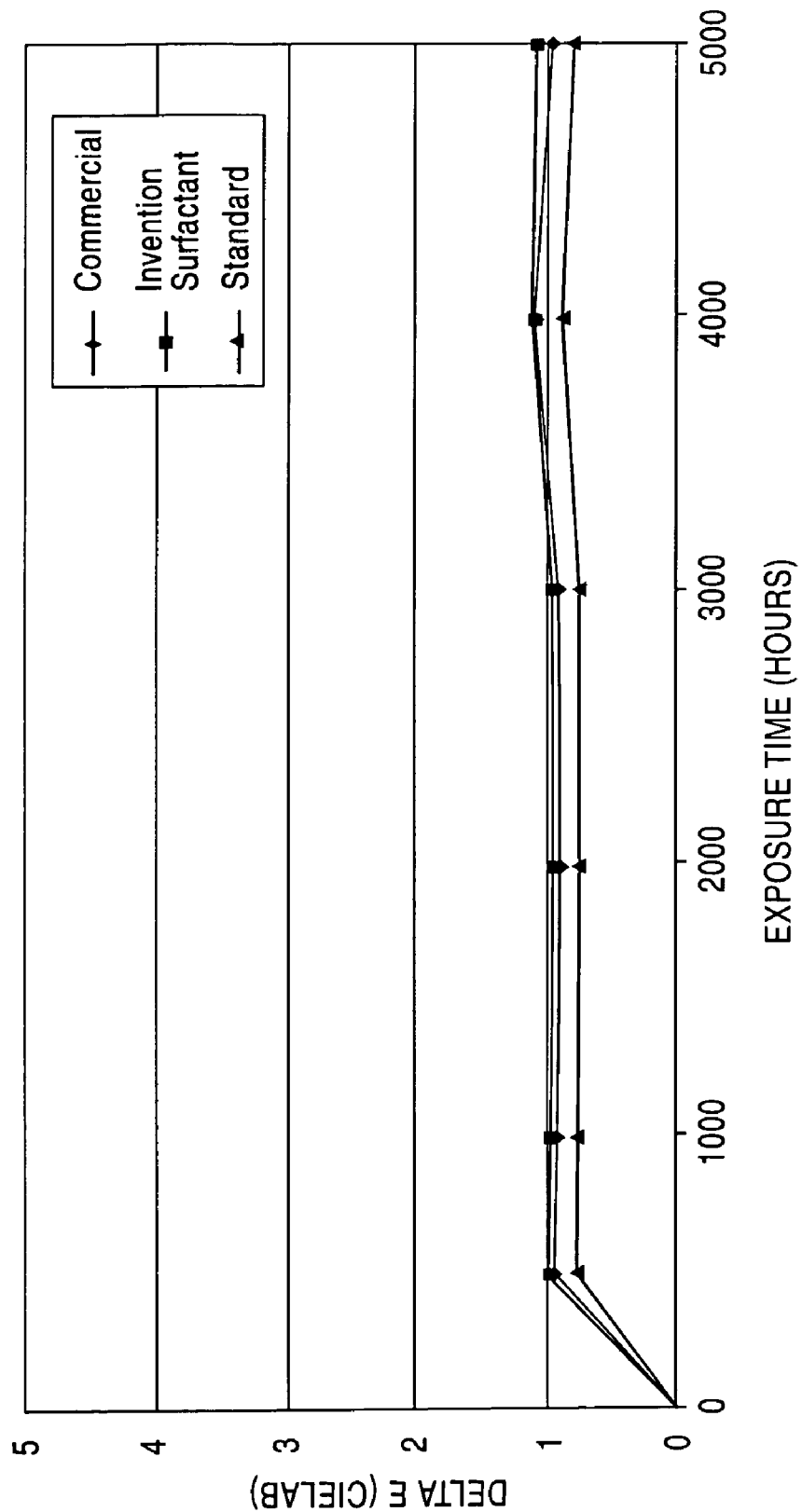
FIG. 2 is a graph showing the colour change of white pigmented panels after 5000 hours of exposure to Xenon lamp.

In FIGS. 1-2 the colour variations (DELTA E (CIELAB)) of white paints are reported depending on the exposure hours in comparison with those of commercial products and those of a standard specimen. The lower the colour variation in the time, the better the paint performance.

Figure 3:
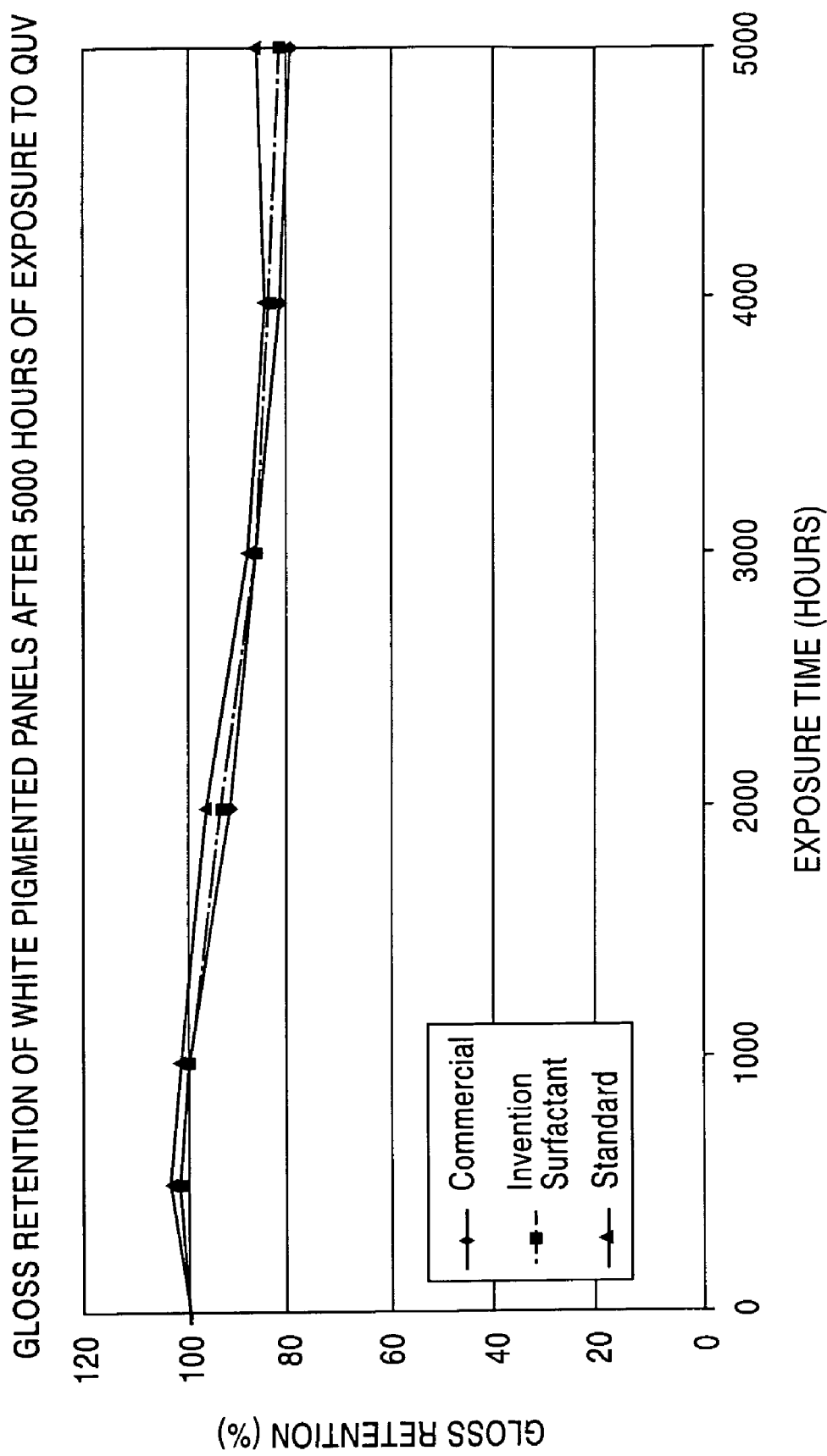
FIG. 3 is a graph showing gloss retention of white pigmented panels after 5000 hours of exposure to QUV.
Figure 4:
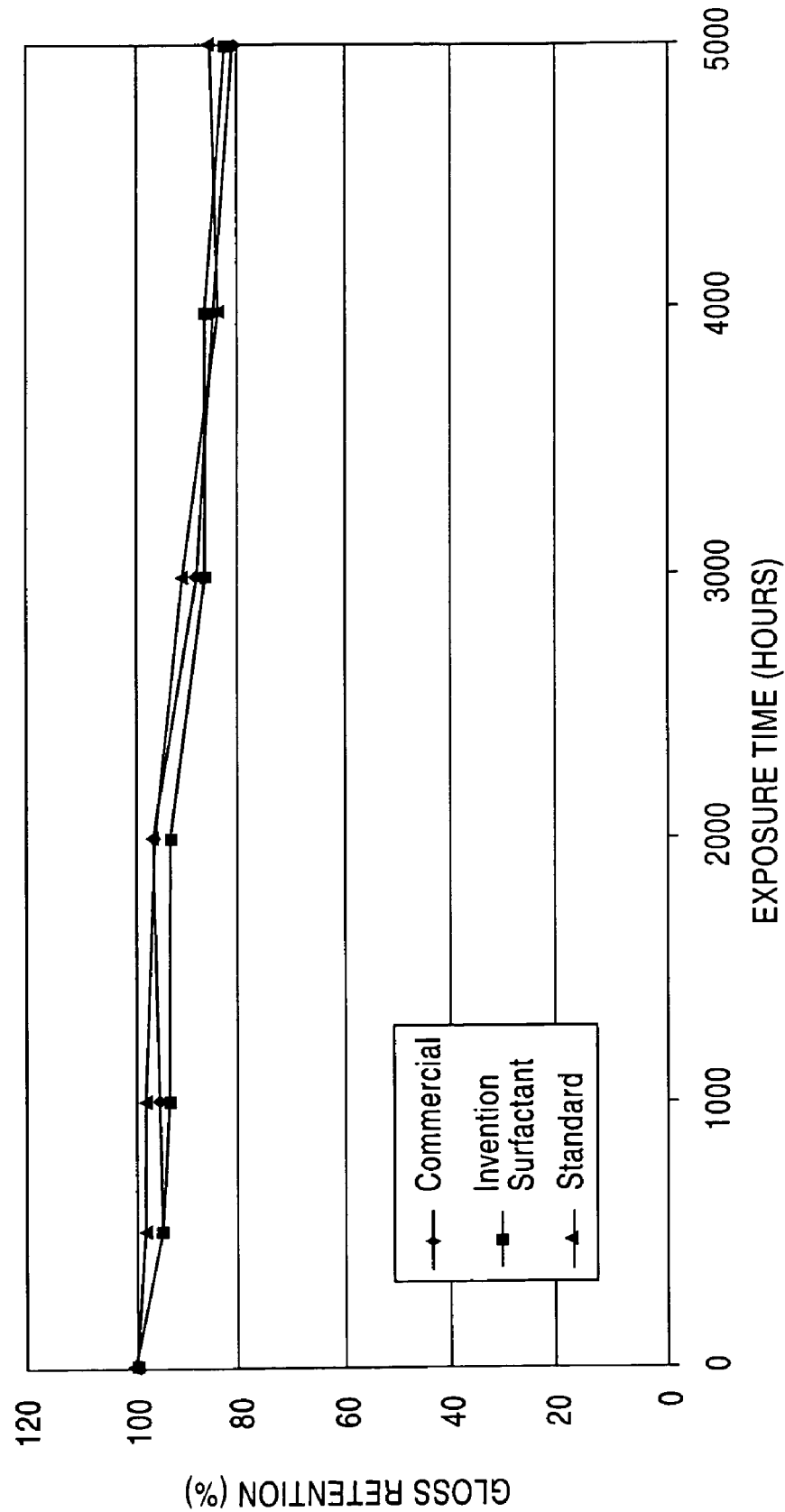
FIG. 4 is a graph showing gloss retention of white pigmented panels after 5000 hours of exposure to Xenon lamp.

In FIGS. 3-4 the gloss variations (GLOSS RETENTION) of white paints are reported depending on the exposure hours in comparison with those of commercial products and those of a standard specimen. The lower the gloss variation in the time, the better the paint performance.

From the examination of the FIGS. 1-4 it results that the product according to the present invention substantially shows the same performances of the products according to the prior art as it shows gloss and colour variations in the time substantially equal to those of the prior art products by using Surflon-based dispersions.

Example 10

Both the specimens obtained with the blue formulations of the Examples 7 and 8 (comparative) were subjected to accelerated ageing compared with a commercial standard of the Quality Control.

The panels were exposed to:

corrosion resistance test (QCT test and salt fog chamber—4,000 hours) Specifications AAMA 2605-02 (7.8).

QUV test (lamps UVB-313; cycle: 8 hours of UV light at 70° C. followed by 4 hours of condensation at 50° C.—5,000 hours)

Accelerated Xenon lamp test (5,000 hours)

All the specimens were examined to show possible blistering effects, delamination or colour variation at different exposure times.

The specimens prepared according to the present invention have shown resistance to moisture and to salt fog (4,000 hours) since they have shown no blistering effects and/or delamination. In particular the resistance to corrosion resulted equivalent to that of the specimens prepared according to the prior art.

Figure 5:
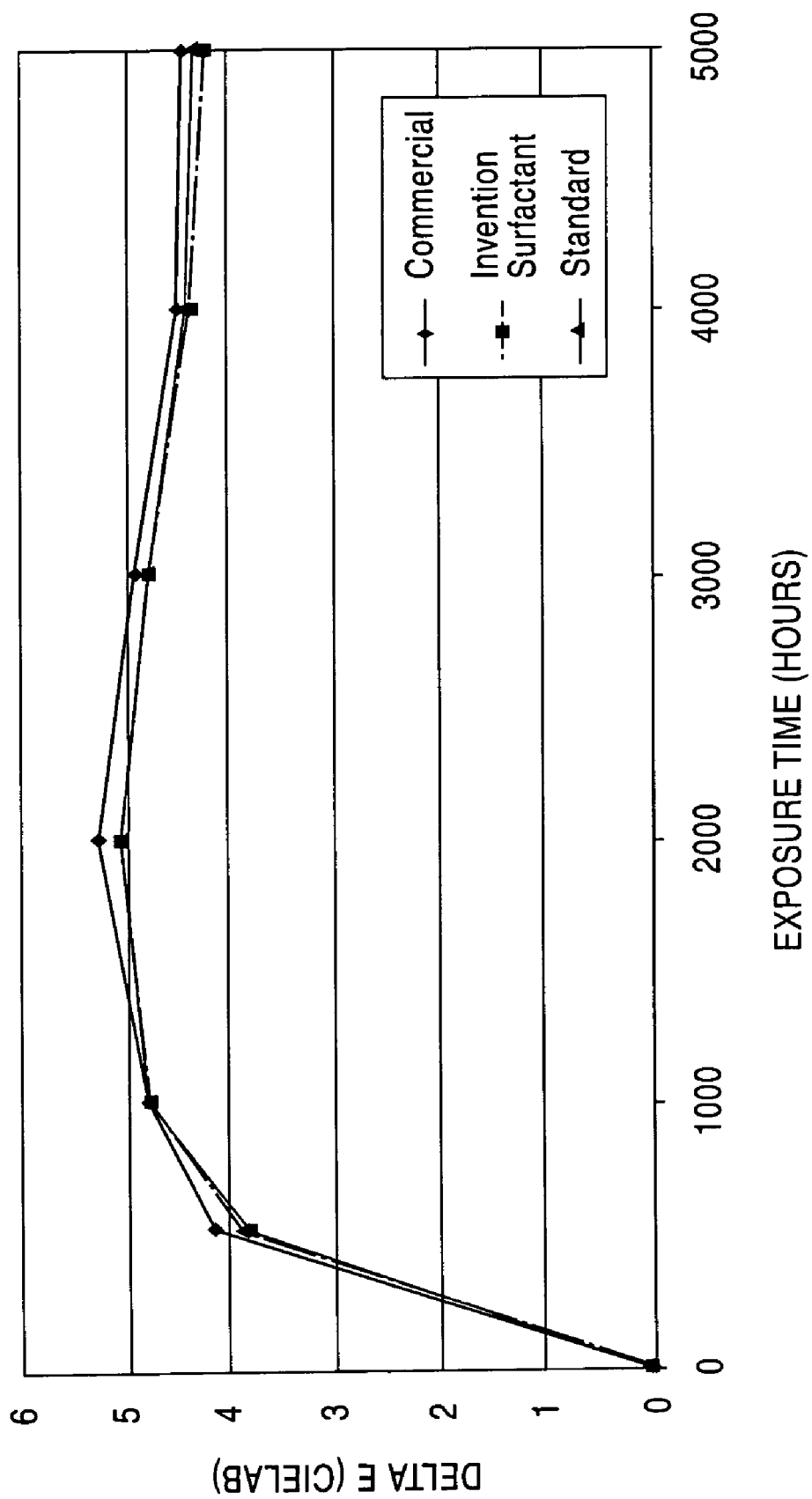
FIG. 5 is a graph showing colour change of blue pigmented panels after 5000 hours of exposure to QUV.
Figure 6:
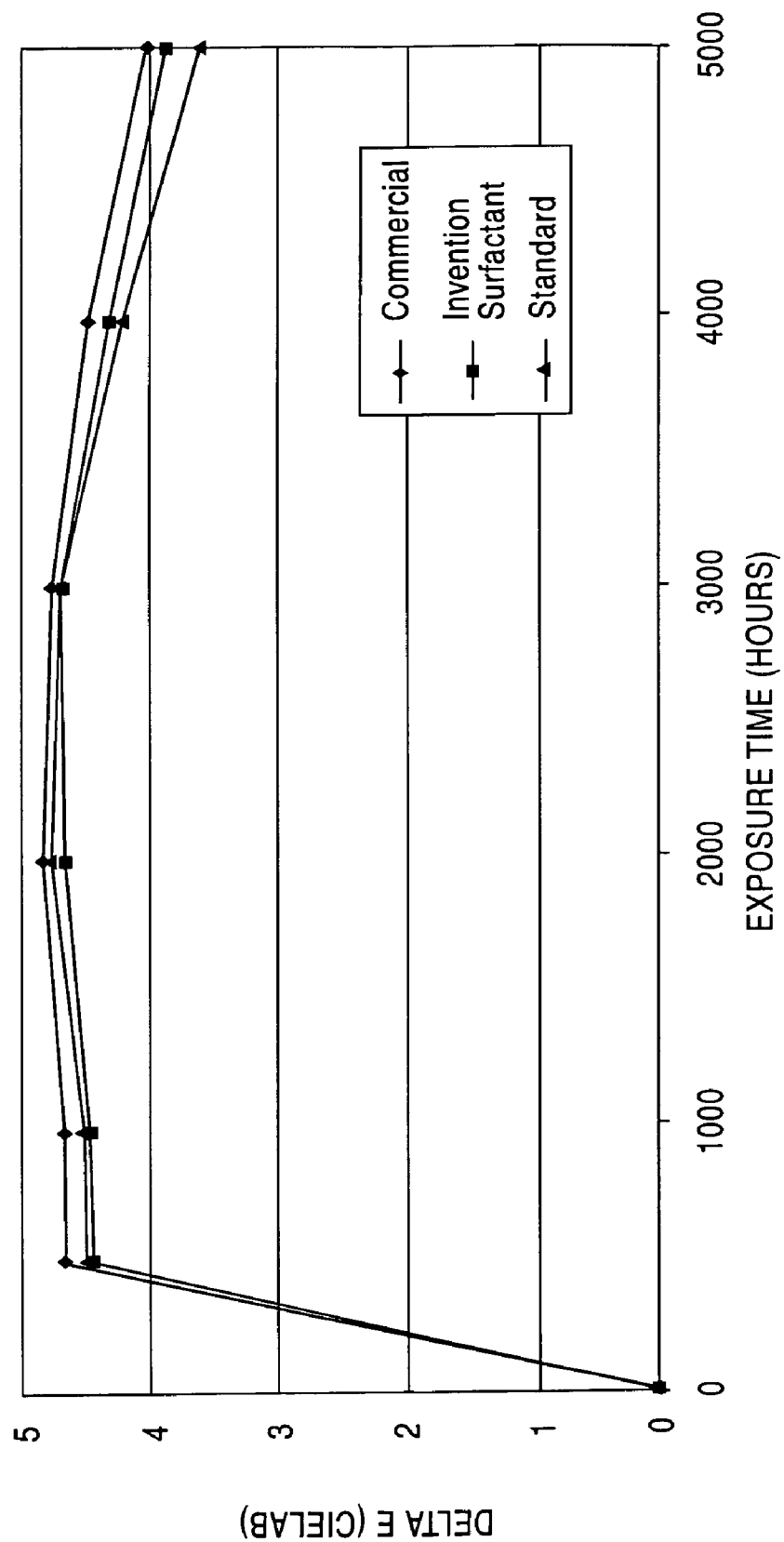
FIG. 6 is a graph showing colour change of the blue pigmented panels after 5000 hours of exposure to Xenon lamp.

In FIGS. 5-6 the colour variations (DELTA E (CIELAB)) of blue paints are reported depending on the exposure hours compared with those of commercial products and those of a standard specimen. The lower the colour variation in the time, the better the paint performance.

Figure 7:
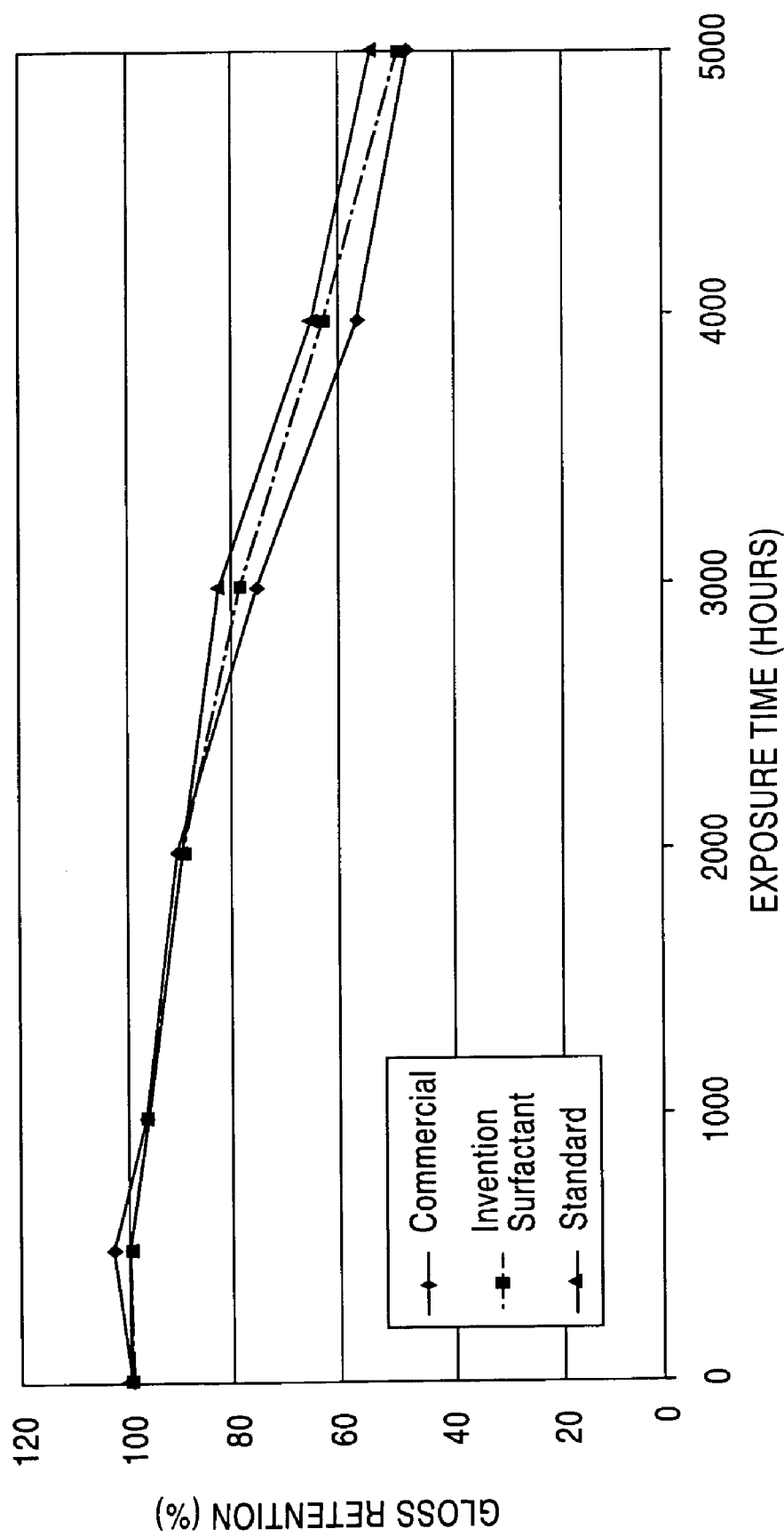
FIG. 7 is a graph showing gloss retention of blue pigmented panels after 5000 hours of exposure to QUV.
Figure 8:
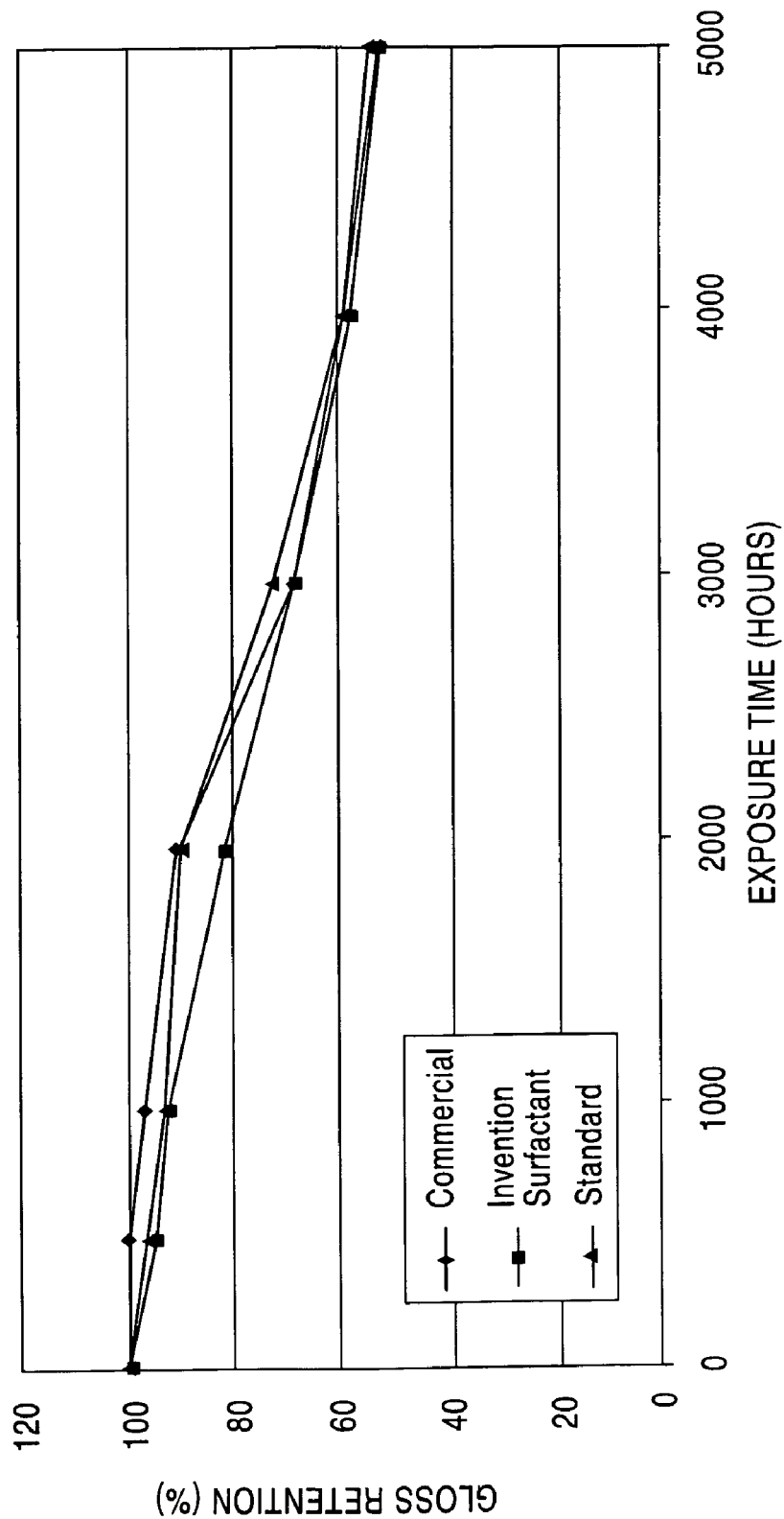
FIG. 8 is a graph showing gloss retention of blue pigmented panels after 5000 hours of exposure to Xenon lamp.

In FIGS. 7-8 the gloss variations (GLOSS RETENTION) of blue paints are reported depending on the exposure hours compared with those of commercial products and those of a standard specimen. The lower the gloss variation in the time, the better the paint performance.

From the examination of the FIGS. 5-8 it results that the product according to the present invention substantially shows t ;same performances of the products according to the prior art as it shows gloss and colour variations in the time substantially equal to those of the prior art products.

Adsorption on Clay

Example 11

It was determined the adsorption on clay of a bifunctional surfactant having a perfluoropolyether (PFPE) structure of formula (I) and having number average molecular weight of 738, and of a perfluorinated carboxylic surfactant (PFC) having 8 carbon atoms $C_7F_{15}ISCOONH_4$ (molecular weight of 430).

The measurements were carried out at various concentrations of the surfactant according to OECD 106 method on soil specimens having a different composition.

The soil specimens were:

Soil 1: clayey soil
Soil 2: sandy soil
Soil 3: alluvial clay soil.

By using said measurements the adsorption isotherms were plotted from which the adsorption constant $K_{OC}$ values, reported in Table5 were calculated.

The higher the $K_{OC}$ value, the stronger the adsorption on the soil. This implies a lower mobility of the surfactant when in contact with the soil.

The adsorption constant values related to the surfactant of formula (I) of the present invention result to be, on an average, superior of one order of magnitude with respect to those of the comparative surfactant.

This implies a classification of the perfluoropolyether bifunctional surfactant of the present invention as a low mobility surfactant in the soil (class 1) while the prior art surfactant results to have a moderate mobility in the soil (class 3).

The surfactant of the present invention can therefore be easily removed from the waste waters by adsorbing it on clay and in case of accidental contact with the soil it shows a low migration potential, thus remaining circumscribed in the soil with a limited earth and water pollution potential.

TABLE 5

| | TYPE OF SOIL | | |
|---|---|---|---|
| | Clayey | Sandy | Alluvial |
| $K_{OC}$ of PFC (ml/g) | 27 | 162.5 | 92.4 |
| $K_{OC}$ of PFPE (I) (ml/g) | 1.190 | 765 | 3.497 |

The invention claimed is:

1. A method for the preparation of paints for substrate coatings, comprising using aqueous dispersions of VDF-based polymers having an average particle size between 0.260 and 0.3 micrometers obtained by VDF emulsion polymerization, in the presence of a bifunctional surfactant of formula:

$$A—R_f—B \qquad (I)$$

wherein
A=—O—CFX—COOM;
B=—CFX—COOM
X=F, $CF_3$;
M =$NH_4$, alkaline metal, H;
$R_f$ is:
  a linear or branched perfluoroalkyl chain; or
  a (per) fluoropolyether chain,
wherein the amount of bifunctional surfactant is in the range of 0.01 to 3% by weight with respect to the VDF-based polymers and the number average molecular weight of the bifunctional surfactant of formula (I) is in the range of 600-800, and optionally in the presence of one or more fluorinated comonomers,
wherein said dispersion contains other fluorinated surfactants which differ from those of formula (I) in amounts not higher than 20% by weight with respect to the total amount of surfactant of formula (I).

2. A method according to claim 1, wherein $R_f$ is a (per) fluoropolyether chain.

3. A method according to claim 2, wherein $R_f$ represents a (per) fluoropolyether chain comprising repeating units selected from one or more of the following, statistically distributed along the chain:
  a) —($C_3F_6O$)—;
  b) —($CF_2CF_2O$)—;
  c) —($CFL_0O$)—, wherein $L_0$=—F, —$CF_3$;
  d) —($CF_2(CF_2)_{z'}CF_2O$)—, wherein z' is an integer 1 or 2;
  e) —($CH_2CF_2CF_2O$)—.

4. A method according to claim 1, wherein $R_f$ has one of the following structures:
  1) —($CF_2O$)$_a$($CF_2CF_2O$)$_b$— wherein a and b are defined hereinafter; when both the units ($CF_2O$) and ($CF_2CF_2O$) are present, b/a is between 0.3 and 10, extremes included, a being an integer different from 0; or one of the two units can be absent;

2) $-(CF_2-(CF_2)_{z'}-CF_2O)_{b'}-$ z' is an integer and is 1 or 2; b' being defined hereinafter;

3) $-(C_3F_6O)_r-(C_2F_4O)_b-(CFL_0O)_t-$ r, b, and t being defined hereinafter; when all the three units are present: r/b=0.5-2.0, (r+b)/t =10-30, b and t being integers different from 0; or one or two of the three units can be absent; $L_0$ being defined above;

4) $-(OC_3F_6)_r-(CFL_0O)_t-OCF_2-R'_fCF_2O-(C_3F_6O)_r-(CFL_0O)_t-$
wherein:
r, t are defined hereinafter;
$R_f$ is a fluoroalkylene group from 1 to 4 carbon atoms; $L_0$ as above;

5) $-(CF_2CF_2CH_2O)_{q'}-R'_f-O(CH_2CF_2CF_2O)_{q'}-$
wherein $R'_f$ as defined above; r as defined below;

6) $-(C_3F_6O)_r-OCF_2-R'_f-CF_2O-(C_3F_6O)_r-$
wherein $R'_f$ as defined above; r as defined below; in said formulas - $(C_3F_6O)$ —can represent units of formula: —(CF (C F_3) CF_2O) —and/or —(CF_2—CF (CF_3) O) —; a, b, b', q', r, t, are integers, such that $R_f$ shows number average molecular weight values such to give the number average molecular weight of the above surfactant of formula (I).

5. A method according to claim 1, wherein the (per) fluoropolyether chain $R_f$ is the structure 1) having the unit $-(CF_2O)_a-(CF_2CF_2O)_b$, —wherein a and b are such that the number average molecular weight of the surfactant of formula (I) is within the above range.

6. A method according to claim 1, wherein the dispersions contain mixtures of surfactants of formula (I).

7. A method according to claim 1, wherein the surfactants different from those of formula (I) are selected from the following:

$$T(C_3F_6O)_{n0}(CFXO)_{m0}CF_2COOM \quad (II)$$

wherein:

T can be Cl or a perfluoroalkoxide group; $C_kF_{2k-1}O$ wherein k=integer from 1 to 3, optionally one F atom being substituted by one Cl atom;
n0 is an integer ranging from 1 to 6 and m0 is an integer from 0 to 6; M and X are as above $$CF_3(CF_2)_{n1}COOM \quad (III)$$

wherein:
n1 is an integer ranging from 4 to 12; M is as above $$F-(CF_2-CF_2)_{n2}-CH_2-CH_2-SO_3M \quad (IV)$$

wherein:
M is as above;
n2 is an integer ranging from 2 to 5.

8. A method according to claim 1, wherein the VDF-based polymer is selected from PVDF and the VDF copolymers containing one or more fluorinated comonomers, preferably selected from chlorotrifluoroethylene (CTFE), hexafluoropropene (HFP), tetrafluoroethylene (TFE), in amounts between 0.1 and 10% by moles.

9. A method according to claim 1 wherein the polymer is PVDF homopolymer.

10. A method of formulating aqueous paints, comprising using the VDF-based aqueous dispersions according to claim 1.

11. A method of preparing paints for powder coating, comprising using powders of VDF-based polymers coagulated from the aqueous dispersions according to claim 1.

12. A method of formulating solvent-based paints, comprising using powders of VDF-based polymers coagulated from the aqueous dispersions according to claim 1.

13. A method according to claim 1, comprising coating metal substrates.

14. Aqueous dispersions based on VDF according to claim 1.

15. A method according to claim 1, wherein the number average molecular weight of the bifunctional surfactant of formula (I) is in the range of 650 to 800.

\* \* \* \* \*